US006712654B1

(12) United States Patent
Putaansuu

(10) Patent No.: US 6,712,654 B1
(45) Date of Patent: Mar. 30, 2004

(54) TURNING OF A PROPULSION UNIT

(75) Inventor: Erkki Mikael Putaansuu, Helsinki (FI)

(73) Assignee: Abb Oy, Helsinki (FI)

(*) Notice: Subject to any disclaimer, the term of this patent is extended or adjusted under 35 U.S.C. 154(b) by 0 days.

(21) Appl. No.: 09/869,326

(22) PCT Filed: Jan. 18, 2000

(86) PCT No.: PCT/FI00/00033

§ 371 (c)(1), (2), (4) Date: Sep. 28, 2001

(87) PCT Pub. No.: WO00/44617

PCT Pub. Date: Aug. 3, 2000

(30) Foreign Application Priority Data

Jan. 26, 1999 (FI) ................................................ 990144

(51) Int. Cl.[7] ................................................ B60H 20/08

(52) U.S. Cl. ....................... 440/53; 440/61; 114/144 R; 114/150

(58) Field of Search ............................ 114/144 R, 150; 440/53, 61; 137/625.66, 596.18; 60/443, 445, 450, 451, 489

(56) References Cited

U.S. PATENT DOCUMENTS 1,774,956 A * 9/1930 Wilson ........................ 440/58
2,586,019 A * 2/1952 Frohlich ...................... 440/58
2,987,027 A * 6/1961 Wanzer ...................... 114/122
3,216,444 A * 11/1965 Herner ....................... 137/493
3,527,186 A * 9/1970 Wennberg ............... 114/144 R
3,707,939 A * 1/1973 Berg .......................... 440/58
3,795,219 A * 3/1974 Peterson ...................... 440/58
3,961,558 A * 6/1976 Dokukin et al. ............... 91/35
4,046,096 A * 9/1977 Liaaen ....................... 440/112
4,087,969 A * 5/1978 Takahashi et al. ............ 60/464
4,136,600 A * 1/1979 Heiser ........................... 91/27
4,358,280 A * 11/1982 Jeanson et al. ................ 440/4
4,426,911 A * 1/1984 Robinson et al. ......... 244/75 R
4,578,039 A * 3/1986 Hall ....................... 114/144 R
4,580,517 A * 4/1986 Lundberg ............... 114/144 R
4,634,389 A * 1/1987 Eptaminitakis .............. 440/53
4,636,701 A * 1/1987 Kodera et al. .............. 318/588
4,878,864 A * 11/1989 Van Bentem ................. 440/5
4,933,617 A * 6/1990 Huber et al. ............ 114/144 R
5,205,764 A * 4/1993 Thiger ......................... 440/58
5,376,029 A 12/1994 Entringer et al.
5,460,554 A 10/1995 Funami et al.

FOREIGN PATENT DOCUMENTS

WO WO 95/12521 5/1995

OTHER PUBLICATIONS

English translation of "Propeller–Drive Arrangement for a Ship or the Like" for Finnish Patent FI 76977.

* cited by examiner

*Primary Examiner*—S. Joseph Morano
*Assistant Examiner*—Ajay Vasudeva
(74) *Attorney, Agent, or Firm*—Arent Fox Kintner Plotkin & Kahn, PLLC

(57) ABSTRACT

The present application is a method and apparatus for moving and steering a vessel traveling in water. The arrangement for moving and steering a vessel includes a propulsion unit having a chamber positioned outside the vessel equipment for rotating a propeller arranged in connection with the chamber, and a shaft means connected to the chamber for supporting the chamber in a rotatable manner at the hull of the vessel. At least one hydraulic motor if used for turning the shaft means in relation to the hull of the vessel for steering the vessel. The arrangement also includes a means for altering the rotational displacement of the hydraulic engine.

10 Claims, 3 Drawing Sheets

Figure 3:
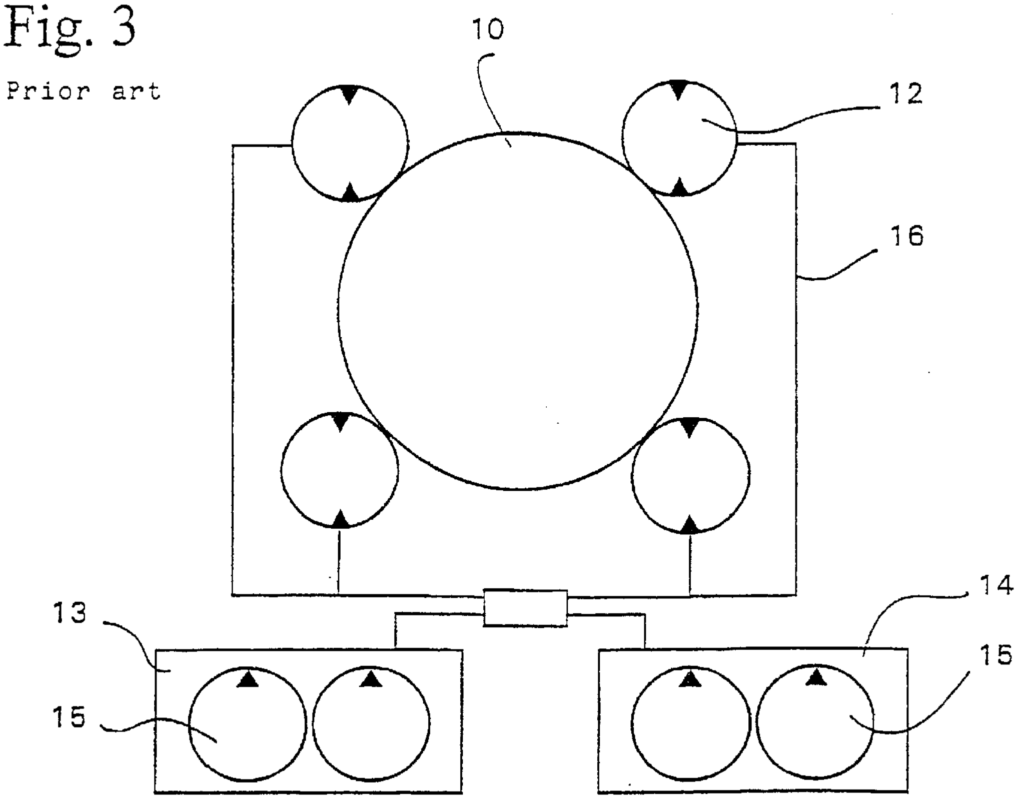
Fig. 3 Prior art

Fig.1
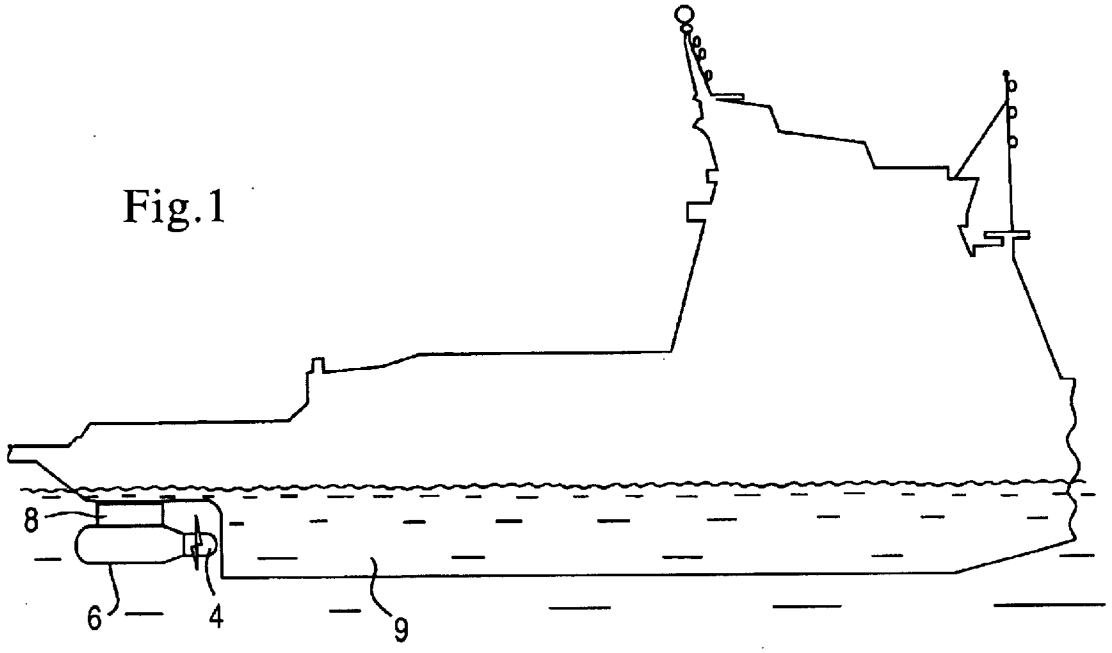
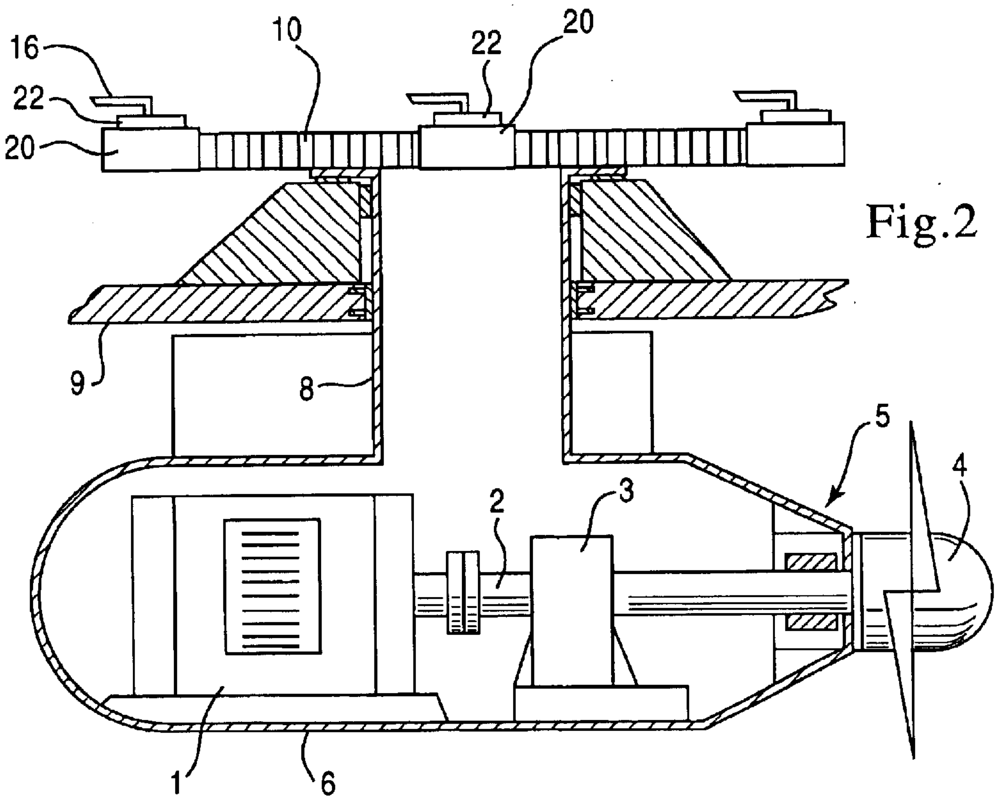
Fig.2

TURNING OF A PROPULSION UNIT

THE FIELD OF THE INVENTION

The present invention relates to a propeller operating arrangement for vessels used in waterborne traffic, and in particular to a propeller operating arrangement which includes a propulsion unit which can be turned in relation to the hull of the vessel and, thus, also can be used for steering the vessel. The invention also relates to a method for moving and steering a vessel travelling in water.

THE BACKGROUND TO THE INVENTION

Various ships or similar vessels (such as passenger ships and ferries, cargo vessels, lighters, oil tankers, ice-breakers, off-shore vessels, navy vessels etc.) are moved in most cases by means of the thrust or pulling force of a rotatable propeller or several propellers. Traditionally, vessels have been steered by means of separate rudder equipment.

Traditionally, propeller operating or rotation systems have been implemented in such a way that the drive device for the propeller shaft, such as a diesel, gas or electric engine, is positioned inside the hull of the vessel, from where the propeller shaft is led via a lead-through that has been sealed to render it watertight to outside the hull of the vessel. The propeller itself is situated at the other end, i.e., the end which extends outside the vessel, of the propeller shaft which is connected either directly to the engine or to a possible gearbox. This solution is employed in the majority of all vessels used in waterborne traffic in order to obtain the power required for moving them.

Later on vessels have been fitted with propeller units in which the direction of the thrust or pulling force produced by the propeller can be altered. In these, the equipment which creates the propulsion in the propeller shaft (ordinarily an electric engine) and a possible gearbox can be positioned outside the hull of the vessel inside a special chamber supported to turn in relation to the hull. According to another alternative, the propulsion is led by means of angle transmissions and drive shafts from the engine inside the hull of the vessel to inside the chamber supported to turn, which is outside the vessel (e.g., arrangements known as rudder propellers).

A propulsion unit fitted with an electric engine inside a chamber is disclosed in greater detail, e.g., in the applicant's FI patent No. 76977. Units of this kind are generally referred to as azimuthing propulsion units, and, e.g., the applicant in this case supplies azimuthing units of this type under the trademark AZIPOD. A propulsion unit fitted with a drive engine outside the chamber is presented in, e.g., U.S. Pat. No. 3,452,703 (Becker).

This kind of propulsion unit fitted with a propeller external to the vessel can be turned in relation to the vessel, which means that it can also be used instead of a separate rudder device for steering the vessel. More precisely, the chamber containing the engine and/or gearbox and any required drive shafts is supported by means of a special pipe shaft or the like to turn in relation to the hull of the ship. The pipe shaft is taken through the bottom of the ship.

In addition to the benefits obtained through the omitting of the long propeller shaft and separate rudder device, the azimuthing propulsion unit in particular has been found to provide a fundamental improvement in the steerability of the vessel as well. The energy economy of the vessel has also been found to have been rendered more efficient. The use of azimuthing propulsion units in various vessels designed for waterborne traffic has indeed become more common in recent years, and it is assumed that their popularity will continue to grow.

In the known solutions, the turning arrangement of the propulsion unit has generally been implemented so that a gear rim or the like turning rim has been attached to the pipe shaft. constituting the unit's turning shaft. This rim is rotated by means of hydraulic motors adapted to co-operate with the unit. The liquid pressure and flow required by the hydraulic motors is usually generated by means of pumps rotated by electric engines. The rotational motion of the rim is also halted and held in the halted position whenever no control movement is performed in the common solution by means of the same hydraulic motors. For this reason, there is constantly the operating pressure maintained by the pumps inside the hydraulic system, also when the vessel is driven straight ahead.

A hydraulic turning system is used, inter alia, since that hydraulics make it possible to produce the relatively large torque required for turning the propulsion unit at a relatively low speed of rotation at the same time as turning and steering the vessel by means of hydraulics can be controlled easily and relatively precisely with the aid of traditional valve machinery and similar hydraulic components. As was already mentioned earlier, one feature which have been obtained with a hydraulic system has been that such a system permits the turning movement of the propulsion unit's shaft to be halted quickly and precisely at the desired position, and this position can then be held, something which has been regarded as an important feature as regards steering a vessel.

According to one known solution, four hydraulic motors have been positioned in connection with a turning rim. Correspondingly, the operating machinery which produces the hydraulic pressure required in the engines comprises four hydraulic pumps and the electric engines rotating them. The hydraulic motors are adapted to two separate hydraulic circuits in order to enhance the operating reliability of the turning equipment, so that both circuits have their own operating machinery which creates hydraulic pressure (a so-called tandem structure) Both circuits contain two pumps and two drive engines turning them, usually with an output of 125 kW, and so the system in its entirety comprises four 125 kW electric engines. This total output is sufficient to produce an adequate turning speed and torque for steering operations both at sea and in ports. In the open sea and at normal travelling speed, a greater torque is required and, at the same time, a turning speed of approx. 3.5 to 5.0 degrees a second (°/s) will usually suffice for the propulsion unit when sailing in open water. In ports, and in particular when sailing to the quay, a vessel's manageability and "agility" are more important features. Then a greater turning speed is required and, at the same time, the need for torque is not as great as when sailing in sea conditions and at higher speeds. For ports and other such steering situations, a speed of approx. 5.0 to 7.5 degrees a second is generally regarded as an adequate turning speed for a propulsion unit. In the known technology, the turning speed of the propulsion unit has been altered by altering the number of running pumps, i.e.,. by switching pumps on/off as required.

The reason why four 125 kW engines (two per circuit) are used in the vessels instead of two 250 kW engines (one per circuit) can be explained by safety considerations: in black-out situations the vessel's emergency systems are able to feed sufficient power into 125 kW engines but would no longer be able to feed 250 kW engines, which would cause the vessel to become unsteerable.

SUMMARY OF THE INVENTION

In the known hydraulic solution, which has been found to be effective and dependable in itself, a number of drawbacks have, however, been detected. In order to obtain an adequate level of reliability and owing to the aforesaid dimensioning of the emergency systems, the vessels have to be fitted with an expensive and complicated hydraulics system consisting of several electric engines and hydraulic pumps and the components which these require (such as hydraulic pipes and valves, electric cables, control devices etc.). The installation of these, monitoring of their condition and maintenance call for a considerable amount of work. In the tandem system according to prior art, part of the benefit in efficiency of use of space and in the simplification of the hydraulics which has been obtained by means of an external propulsion unit, and an azimuthing propulsion unit in particular, is lost.

One drawback of the hydraulic systems is also the fact that they are known to have a tendency to leak/drip oil or similar hydraulic fluid into their surroundings, in particular from tubes and various connections and seal surfaces. This causes both a tidiness problem and also a safety risk. The internal pressure of the hydraulic system is also relatively high, and thereby the breakage of, e.g., a hydraulic tube can cause a major safety risk. When it is running, a hydraulic system is also noisy, and this has an effect, inter alia, on the working conditions of the operating personnel. The noise is continuous, since the system has to be switched on throughout the time when the vessel is in motion. In order to minimize these disadvantages, it should be possible to obtain a solution for reducing the number of hydraulic components and in particular various pipes, tubes and connections, and pumps and their operating engines.

Furthermore, in the known solution, the speed of the turning movement of the propulsion unit can be influenced only by altering the volume flow rate (the volume flow rate of the pumps) of the liquid pumped into the system, which is done either by altering the number of engines used and thereby of the pumps pumping the hydraulic fluid or the speed of revolutions of the engines. However, there are situations in which the possibility of a considerably wider range of turning speeds of the unit or even of a stepless turning speed would be desirable.

The purpose of the present invention is to eliminate the drawbacks of the known technology and to obtain a new, improved solution for turning a propulsion unit in relation to the hull of the vessel.

One objective of the invention is to obtain a solution in which the number of components in the hydraulic system can be reduced without compromising on turning speed, usability and the reliability of the system.

One objective of the invention is to obtain a solution whereby the overall economy of the propulsion unit's hydraulic turning machinery is improved compared to the known solutions.

One objective of the invention is to obtain a solution by means of which the maximum power requirement of the turning machinery can be reduced.

One objective of the invention is to obtain a solution by means of which the noise level of the propulsion unit's turning machinery can be reduced compared to the known solutions.

One objective of the invention is to obtain a solution by means of which the turning speed of the propulsion unit can be altered and/or controlled in a new way.

The present invention which obtains these objectives is based on the basic realization that the turning speed of the propulsion unit can be controlled by altering the rotational displacement of the hydraulic motors which turn the propulsion unit. More precisely, the arrangement according to the invention is characterized in particular by what is disclosed in the characterizing portion in enclosed independent claim 1.

The method according to the invention is characterized by what is disclosed in the characterizing portion in enclosed independent claim 7.

According to advantageous embodiments of the present invention, the means for altering the rotational displacement comprise a two-speed valve, a three-speed valve or the like valve fitted in connection with the hydraulic motor which valve can be used to alter the displacement of the motor, advantageously a radial piston motor. Said means for altering the displacement of the hydraulic motor can also be integrated into the hydraulic motor itself. According to an embodiment which is regarded as advantageous, the system comprises two hydraulic pumps and electric motor drives arranged to rotate them, and four hydraulic radial piston motors arranged so that their displacement can be altered, which motors have been arranged to rotate the turning rim arranged at the propulsion unit's shaft means. The operating equipment of the hydraulic motor's power input unit can include a frequency transformer. The adjustment of the turning speed of the propulsion unit's shaft means can also be arranged to be stepless.

According to one embodiment which is regarded as advantageous, the displacement of the hydraulic motor is altered in a ratio of 2:3.

The turning speed of the shaft means can also be adjusted, in addition to altering the rotational displacement of the hydraulic motor, by adjusting the power input and/or volume flow rate of the pumps in the hydraulic system which operates the hydraulic motor.

The present invention provides a number of significant advantages. It allows the number of required components, such as pumps, their operating devices and hydraulic pipings and the connections between these to be reduced. The same maximum turning speed can be obtained with half of the electric power which is required in solutions according to prior art. The required amount of hydraulic medium can also be reduced. The pressure level of the system can also be reduced. The omitted components, smaller amount of medium and lower pressure level reduce the noise level of the system. The turning solution disclosed provides a propulsion unit turning arrangement that can be adjusted, in a versatile manner, with respect to the speed and which arrangement is implemented with fewer components and lower costs than before.

The invention and its other objects and advantages are described in greater detail in the following exemplifying disclosure with reference also to the enclosed drawing, where the corresponding reference numbers in the various Figures refer to corresponding features.

A BRIEF DESCRIPTION OF THE DRAWINGS

Figure 4:
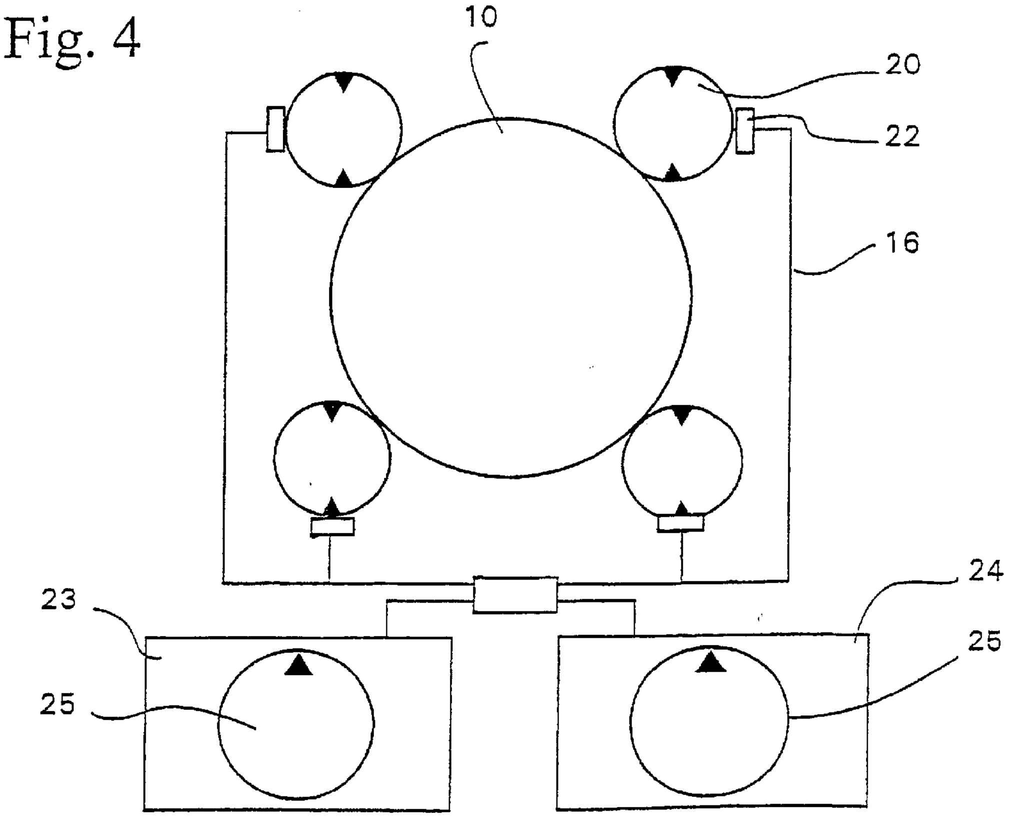
Figure 5:
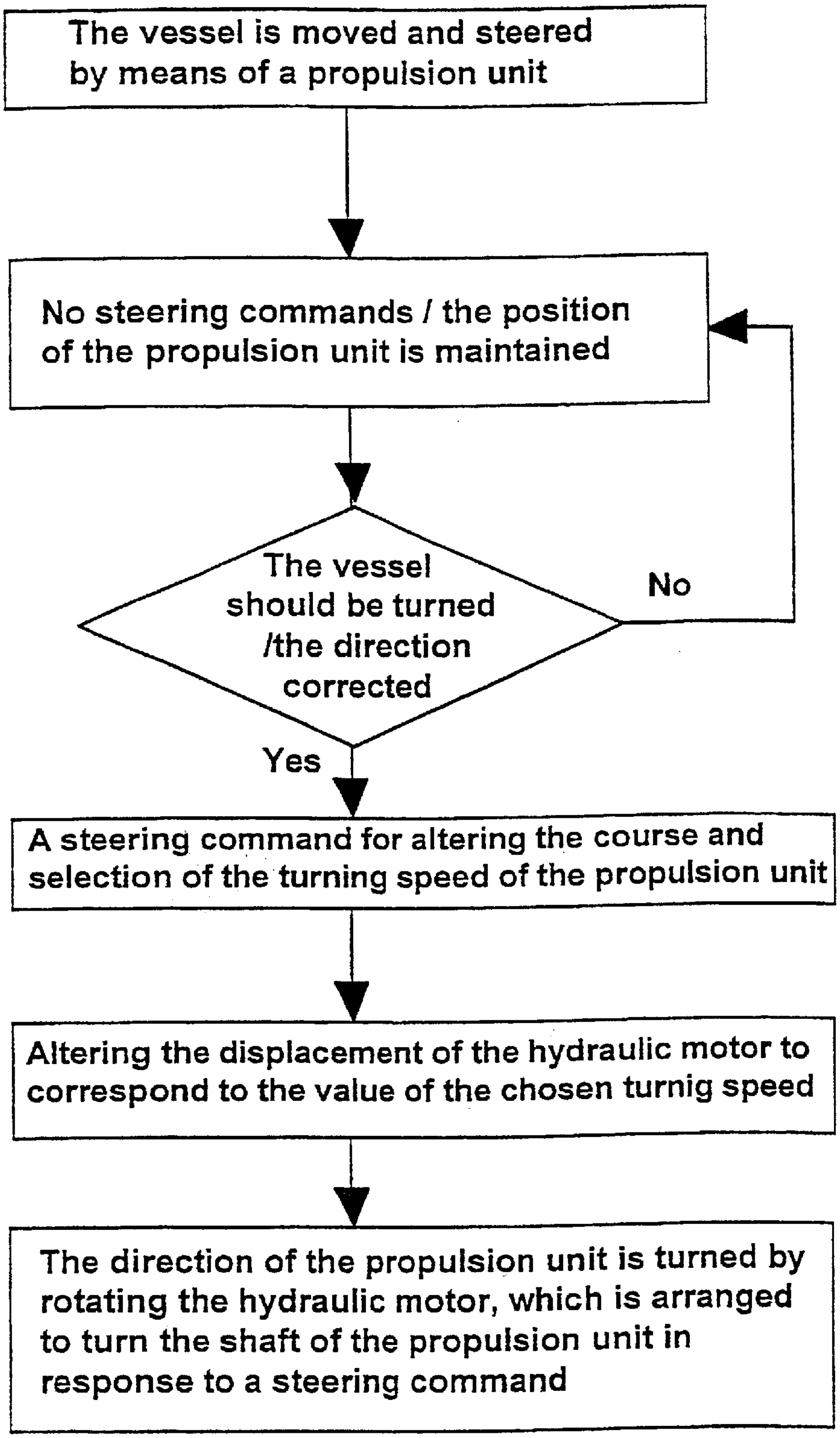

FIG. 1 discloses a ship and a propulsion unit installed therein,

FIG. 2 discloses a simplified diagrammatic visualization of the turning arrangement of the propulsion unit according to FIG. 1, FIG. 3 discloses a diagram of a Prior Art solution according to the known technology, FIG. 4 discloses a diagram of an arrangement according to the invention, and FIG. 5 discloses a flowchart for the function of a turning arrangement according to the invention.

A DETAILED DESCRIPTION OF THE DRAWINGS

FIG. 1 discloses an azimuthing propulsion unit 6 fitted to turn in relation to the hull 9 of a vessel. FIG. 2 discloses, in turn, one exemplifying embodiment of a hydraulic turning machinery. More precisely, FIG. 2 discloses an azimuthing propulsion unit 6, which comprises a watertight chamber 5. Said chamber 5 has been fitted with an electric motor 1, which can be any kind of known electric motor structure. Said electric motor 1 is connected via a shaft 2 to a propeller 4 in known manner known per se. According to one alternative, the structure can also comprise a gearbox fitted in said chamber between said electric motor 2 and said propeller 4. In accordance with one alternative (not shown) there are more than one propeller per chamber. In that case, there can be, e.g., two propellers, one at the front of the chamber and one at the rear of the chamber.

Said chamber 1 is supported to turn around a vertical axis in relation to the hull 9 of the vessel on an essentially vertical shaft means 8. Said shaft means 8 (such as a hollow pipe shaft) can be of such a diameter that it allows maintenance work to be performed therethrough on the motor, a possible gearbox and propeller shaft low down in the chamber.

A 360° gear rim 10 or a corresponding turning rim is connected to said shaft means 8 for transferring, to said shaft means 8, the propulsion required for turning the shaft means in relation to the hull 9 of the vessel. When said shaft means 8 is turned, said propulsion unit 6 rotates accordingly. In the case disclosed in FIG. 2 the turning machinery of said gear rim 10 comprises four hydraulic motors 20, whose power input arrangement is explained in greater detail in connection with the description of to FIG. 4.

The hydraulic motors 20 are advantageously so-called radial piston engine. One such radial piston engine can comprise, e.g., 16 separate pistons moving in a radial direction, whose working strokes have been arranged in separate phases whereby the liquid flow fed into the motor causes the gear rim part fitted to the outer rim of said motor 20 to rotate and thereby gear rim 10 to rotate. Although the gear rim part adapted to rotate has usually been fitted to the outer rim of said motor 20, in which case the structure of the engine will be essentially low, some other solution can also be employed, such as a gear rim arranged at the other side of the motor. The radial piston engine, which is manufactured and supplied, inter alia, by the Swedish company known as Hägglunds Drives, is as such well known to a person skilled in the art and a solution that is commonly employed for turning propulsion units, and its functioning is thereby not explained here in any greater detail.

FIG. 3 discloses in the form of a diagram a solution according to prior art, which comprises four hydraulic motors 12 which rotate said turning rim 10 and the corresponding four pumps 15 and the required pipe connections 16 between them. For the sake of clarity, however, the 125 kW electric engines (4 in total) which actuate said pumps 15 are not shown. In this twin-circuit, i.e., tandem solution, each parallel hydraulic circuit 13 and 14 comprises two pumps 15 and two electric motors. The arrangement is such that when the pumps, each of which has a displacement of 250 $cm^3/r$, are used, each circuit generates an output (liquid flow) which by itself would create a turning speed of 3.75 degrees a second, from which it follows that a maximum turning speed for the propulsion unit of 7.5 degrees a second is obtained in the event that all four electric engines are switched on and are activating the corresponding pump.

FIG. 4 discloses a similar diagram for an arrangement according to the present invention. Correspondingly, the solution is of the tandem type, i.e., it comprises two separate identical power feeding circuits or units 23 and 24. The units each comprise only one pump unit 25 and only one 125 kW electric engine. Pump units 23 and 24 in FIG. 4 each generate by themselves an output which, in the system equipped with the hydraulic motors of the kind presented in FIG. 3, would be able to provide a maximum turning speed of 2.5 degrees a second, i.e., the total turning speed would be 5 degrees a second. However, this is not a sufficient value.

The inventor has been surprised to discover that the required turning speed, i.e., 7.5 degrees a second, can also be obtained in an arrangement according to FIG. 4, i.e., with only two pump units and by using only two 125 kW electric engines. This is achieved by altering the rotational displacement of said hydraulic motors 20 whereby the same amount of in-flowing hydraulic medium will bring about a different rate of rotation at said motor 20. The displacement can be altered, e.g., by using what are known as two-speed valves, three-speed valves, four-speed valves etc. or a variable-volume hydraulic motor. In the solution according to FIG. 4, the rotational displacement of one pump can be of the order of approx. 400 $cm^3/r$, i.e., a total of approx. 800 $cm^3/r$.

In FIG. 4, reference number 22 indicates a two-speed valve fitted to the radial piston motor 20, usually to its side. Said valve 22 is arranged for adjusting the position of the dividing spindle of said radial piston motor 20 to the desired degree (usually a few millimeters). This affects the motor so that the desired number of its pistons moving in a radial direction are rendered pressureless, and this affects the rotational displacement of the engine. Valves are available, e.g., for a volume alteration ratio of 1:2 (half of the pistons are pressureless), 1:3 (2/3 of the pistons are pressureless) and 2:3 (1/3 of the pistons are pressureless) , of which the latter is regarded as particularly advantageous in this example, as will be presented a little later. The principle of the multi-speed valve is the same, but it is arranged to move the said dividing spindle to several different positions, in accordance with the type declaration of the valve.

In accordance with another possible solution, the motor has in itself been arranged to be of a variable volume. An option of this kind is provided, e.g., by an axial piston motor, such as a banana engine (the name comes from its banana-like shape) In an axial piston motor, the stroke of the pistons is altered by altering the cam angle of the motor with the aid of means integrated into the engine. Adjustable axial piston engines allow stepless adjustment of the hydraulic motor's displacement, and thereby also adjustment of the propulsion unit's turning speed.

When the displacement of the hydraulic motor is divided, e.g., with a 2:3 two-speed valve in a ratio of 2:3, the same amount of hydraulic medium will provide a rotation speed which is 3:2 compared to the normal situation. Whereas it was presented above that with the pump units according to FIG. 4 a turning speed of 5 degrees a second is obtained with normal hydraulic motors, a turning speed of $3/2 \times 5°/s = 7.5°/s$ is now obtained. As was presented above, this value for the turning speed of 7.5 degrees a second is considered sufficient.

It must be observed that not all the aforesaid elements are always necessary in the turning machinery for implementing the invention, but that some of them can be omitted or replaced with other elements, and that the arrangement of the operating equipment may deviate from the two-circuit solution presented. At its minimum, only one hydraulic motor is required for turning the propulsion unit. It must also be observed that the aforesaid dimensioning values are presented for illustrating the invention better, and that engine output values, turning speed values and displacement ratios other than those presented can, thus, also be used in the invention.

In accordance with one embodiment of the present invention which provides very versatile possibilities for controlling the turning speed, the operating output of the electric motors which operate pumps 25 can be fed by a frequency transformer (not shown) acting as the power source. In that case, the turning speed can be adjusted both by adjusting the displacement of said motors 20 and by adjusting the volume flow rate of the pumps. The operating principle of a frequency transformer is, as such, a technology known per se to a person skilled in the art, and so there is no need to explain it here otherwise than by remarking that the general main components of a frequency converter comprise a rectifier, a direct voltage intermediate circuit and an inverter. Frequency converters are generally used nowadays as input devices for AC engines, and they are particularly advantageous in various adjustable electric drives. The most commonly used frequency converters are what are known as PWM (Pulse Width Modulation) converters fitted with voltage intermediate circuits and based on pulse width modulation technology. A frequency converter is economical to use, inter alia, due to the fact that it can be used for adjusting the turning speed of the turning machinery, and thereby of shaft 8. In accordance with one solution, at least two different speeds are in use. In accordance with another solution, the turning speed can be adjusted within a predetermined speed range, such as within the range 0 to nominal turning speed.

The function of the frequency converter is controlled by means of a suitable control unit (such as a servo control), which is, in turn, connected functionally to a control device, such as a steering wheel, on the bridge or a similar place, by means of which the vessel's actual steering commands are issued. The steering commands issued manually with the steering wheel are converted, e.g., by means of a separate analogue servo into a course command. According to another solution, the steering commands are converted by means of a converter connected to the steering wheel into digital steering signals, which are sent to the control unit.

FIG. 5 shows a flowchart for one embodiment of the turning equipment according to the present invention. In accordance with the invention, the vessel is moved and steered by means of the propulsion unit. The position of the propulsion unit can if necessary be observed by means of a suitable sensor device. If an observation is performed, the information provided by the sensor device can be utilized either in analogue format, or it can if necessary be converted into digital format. If no new command for changing course is issued, the position of the propulsion unit is maintained in the direction last issued from the bridge. If, through an observation of the position data or otherwise, it becomes apparent that the course of the vessel needs to be altered by changing the turning position of the propulsion unit, this can be performed in one embodiment of the invention automatically by means of the vessel's automatic control system (not shown).

Whenever the vessel has to be turned, the command for this is issued to the vessel's control system, such as a processor-controlled control unit. The command is processed in the control system in a predetermined fashion. After processing, the control unit issues a command to the propulsion unit's turning machinery. The function of the electric motors which operate the pumps and possibly also the number of motors to be used are controlled, e.g., by controlling the function of the electric power source, after which the desired rotation of the electric motor causes the propulsion unit to turn via the turning machinery in the desired manner, and the vessel alters its course accordingly. A turning speed suitable for the circumstances can also be selected from the bridge. The turning speed of the propulsion unit's shaft can also be adjusted either in degrees (at its minimum only two speeds, or a number of different turning speeds) or steplessly. The turning speed command is issued to the equipment which regulates the displacement of the hydraulic motors, which alters the displacement of the hydraulic motors and thereby the turning speed of the propulsion unit accordingly. In accordance with the above, adjustment can also take the form of a combination of the adjustment of the hydraulic motors'displacement and the pumps'volume flow rate.

The invention has thus resulted in equipment and a method which can be used to obtain a new kind of solution for steering a vessel fitted with a propulsion unit. The solution avoids the drawbacks of the prior art, and also provides an advantage with regard to a simpler structure and a superior overall economy, convenience of use and operating safety. It should be observed that the aforesaid examples of embodiments of the invention do not limit the scope of protection for the invention as disclosed in the claims, but that the claims are intended to cover all modifications, equivalencies and alternatives within the spirit and scope of the invention, as specified in the appended claims.

What is claimed is:

1. An arrangement for moving and steering a vessel traveling in water, said arrangement comprising:

a propulsion unit (6) comprising a chamber (5) positioned outside the vessel, equipment for rotating a propeller (4) arranged in connection with said chamber, and a shaft means (8) connected to said chamber (5) for supporting said chamber, in a rotatable manner, at the hull (9) of said vessel, at least one hydraulic motor (20) for turning said shaft means (8) in relation to the hull (9) of said vessel for steering said vessel, wherein the arrangement comprises means (22) for variably altering the displacement volume of the hydraulic motor (20).

2. An arrangement according to claim 1, wherein said means for altering the displacement volume comprise a two-speed valve (22), three-speed valve or a valve providing a higher number of motor speeds, arranged in the connection with said hydraulic motor (20).

3. An arrangement according to claim 1, wherein said means for altering the displacement volume of the hydraulic motor are integrated into said hydraulic motor (20).

4. An arrangement according to claim 1, further comprising two hydraulic pumps (23, 24) and electric motor drives arranged to rotate them, and four hydraulic radial piston motors (20) arranged so that their displacement volume can be altered, which motors are arranged to rotate a turning rim (10) arranged in said shaft means (8).

5. An arrangement according to claim 1, wherein control means for the hydraulic motor's (20) power input unit (23, 24) includes a frequency transformer.

6. An arrangement according to claim 1, wherein the adjustment of the turning speed of the shaft means (8) is arranged to be stepless.

7. A method for moving and steering a vessel traveling in water, in which method the vessel is moved using a propulsion unit (6), which comprises a chamber (5) positioned outside the vessel, equipment positioned inside the chamber for rotating a propeller (4) arranged in connection with said chamber, and a shaft means (8) connected to said chamber for supporting said chamber, in a rotatable manner, to the hull (9) of said vessel, the shaft unit (8) is turned, by at least one hydraulic motor (20), in relation to said hull (9) of said vessel for steering said vessel, wherein the turning speed of said shaft means (8) in relation to said hull (9) is altered by variably altering the displacement volume of said at least one hydraulic motor (20).

8. A method according to claim 7, wherein the displacement volume of said hydraulic motor (20) is altered by means of a two-speed valve (22), a three-speed valve, a four-speed valve or valve allowing for more speeds.

9. A method according to claim 7, wherein the displacement volume of the said hydraulic motor (20) is altered in a ratio of 2:3.

10. A method according to claim 7, wherein the turning speed of said shaft means (8) is controlled, in addition to controlling the displacement volume of said hydraulic motor (20), by controlling at least one of the electric input and volume flow rate of the pumps (25) of the hydraulic system (23, 24) which operates at least one of said hydraulic motors (20).

* * * * *